United States Patent Office 2,904,590
Patented Sept. 15, 1959

2,904,590

ACETANILIDE DERIVATIVES AND THE MANUFACTURE THEREOF

Peter Oxley, Norman William Bristow, George Alfred Harrison Williams, Gerald Woolfe, and Eric Charles Wilmshurst, Nottingham, England, assignors to Boots Pure Drug Company Limited, Nottingham, England, a British company No Drawing. Application March 21, 1956
Serial No. 572,806

Claims priority, application Great Britain March 24, 1955

6 Claims. (Cl. 260—562)

The invention relates to new derivatives of acetanilide which have been found to possess valuable properties as amoebicides.

The invention consists in the compounds of the general formula:

in which R represents an alkyl group and in which the benzene nucleus X may be substituted by one or more nitro groups and/or one or more groups represented by the formula $-NR_1R_2$ where $R_1$ and $R_2$ may be the same or different and represent hydrogen atoms or alkyl radicals and in which the benzene nucleus X may be additionally substituted by one or more hydroxy groups.

The compounds of the invention may be prepared in various ways, the most convenient method in each case being dependent on the substituents present in the benzene nucleus X (see Formula I).

Thus the majority of compounds represented by Formula I may be prepared by the interaction of dichloroacetyl chloride and a substituted aniline of the general Formula II

in which R has the significance as hereinbefore defined and in which the benzene nucleus A may be substituted by one or more nitro groups and/or one or more groups represented by the formula $-NR_3R_4$ where $R_3$ and $R_4$ may be the same or different and represent alkyl groups and in which the benzene nucleus A may be additionally substituted by one or more hydroxy groups.

Some of the compounds of the invention represented by Formula I which include in the benzene ring X one or more nitro groups among the substituents as hereinbefore defined may also be made by nitration of the appropriate N-dichloracet-N-substituted anilide.

Compounds of the invention represented by Formula I which include in the benzene ring X one or more amino groups among the substituents as hereinbefore defined may be prepared from the corresponding nitro compounds in known manner by reduction of the latter with, for example, stannous chloride in the presence of hydrochloric acid.

The following non-limitative examples illustrate the invention:

Example 1

In the preparation of dichloroacet-4-hydroxy-N-methyl-3-nitroanilide, a mixture of 18 cc. of fuming nitric acid and 60 cc. of glacial acetic acid is slowly added to a stirred suspension of 15 grams of dichloroacet-4-hydroxy-N-methylanilide (prepared as described in our co-pending application No. 523,110 filed on July 19, 1955) in 60 cc. of glacial acetic acid. The reaction temperature is kept below 25° C. by water cooling. When the addition is complete, the resulting clear brown solution is stirred for a further half hour and is poured into a large excess of a mixture of ice and water. The precipitate which separates is collected by filtration, washed with a small quantity of water and crystallised twice from 40 cc. portions of alcohol. There is thus obtained dichloroacet-4-hydroxy-N-methyl-3-nitroanilide in the form of a crystalline solid which has a melting point of 111° C. (Found: N, 10.2. $C_9H_8O_4N_2Cl_2$ requires N, 10.0%.)

Example 2

In the preparation of dichloroacet-N-methyl-4-nitroanilide, a mixture of 40 grams of N-methyl-p-nitro-aniline and 39 grams of dichloroacetyl chloride in 360 cc. of benzene is heated under reflux for 2 hours. At the end of this time the solution is allowed to cool and is diluted by the addition of 350 cc. of ether and the precipitate so obtained is collected by filtration. There is thus obtained dichloroacet-N-methyl-4-nitroanilide in the form of a crystalline solid which has a melting point of 130° C. (Found: N, 10.9. $C_9H_8O_3N_2Cl_2$ requires N, 10.7%.)

In a similar manner, using N-methyl-m-nitroaniline, there is obtained dichloroacet-N-methyl-3-nitroanilide which has a melting point of 94.5° C. (Found: N, 10.85. $C_9H_8O_3N_2Cl_2$ requires N, 10.7%.)

Example 3

In the preparation of dichloroacet-4-dimethylamino-N-methylanilide, a solution of 9.0 grams of dichloroacetyl chloride in 20 cc. of benzene is slowly added to a stirred mixture of 13.1 grams of trimethyl-p-phenylenediammonium dichloride, 28 grams of sodium acetate, 50 cc. of water and 50 cc. of benzene. The reaction temperature is kept below 10° C. by cooling in an ice-bath. When addition is complete, the stirred solution is allowed to rise to room temperature by removal of the ice-bath and, after 0.75 hour, the ice-bath is replaced and 40 cc. of 5 N sodium hydroxide solution is added slowly to the solution. The benzene layer is separated from the aqueous layer, washed with 50 cc. of water and, after drying over anhydrous magnesium sulphate, is evaporated to give a crystalline residue. This is recrystallised twice from a mixture of equal parts of benzene and petroleum ether (boiling range 60–80° C.). There is thus obtained dichloroacet - 4 - dimethylamino - N - methylanilide in the form of a crystalline solid which has a melting point of 90° C. (Found: N, 11.1. $C_{11}H_{14}ON_2Cl_2$ requires N, 10.7%.)

Example 4

In the preparation of 3-amino-N-dichloroacet-4-hydroxy-N-methylanilide, 13.9 grams of dichloroacet-4-hydroxy-N-methyl-3-nitroanilide (prepared as described in Example 1) is slowly added in small portions to a stirred solution of 38 grams of stannous chloride in 35 cc. of concentrated hydrochloric acid. The reaction temperature is kept below 30° C. by water cooling. When the reaction is complete, the solution is cooled to 0° C. and the precipitate which separates is isolated by filtration and is washed with 20 cc. of concentrated hydrochloric acid. The washed precipitate is dissolved in 100 cc. of water containing 5 cc. of concentrated hydrochloric acid and an excess of hydrogen sulphide is passed into the stirred solution. The precipitate of stannic sulphide so obtained is removed by filtration and excess aqueous ammonia is added to the filtrate producing a small black flocculent precipitate which is removed by filtration. The filtrate is evaporated in vacuo to 200 cc. and is cooled to 0° C. The dark grey precipitate which separates is isolated by filtration and is recrystallised twice from small quantities of aqueous alcohol. There is thus obtained 3-amino-N- dichloroacet-4-hydroxy-N-methylanilide in the form of a crystalline solid which has a melting point of 108–109° C. (Found: N, 11.2. $C_9H_{10}O_2N_2Cl_2$ requires N, 11.2%.)

*Example 5*

In the preparation of 4-amino-N-dichloroacet-N-methylanilide, 13.2 grams of dichloroacet-N-methyl-4-nitroanilide (prepared as described in Example 2) is slowly added to a stirred solution of 45 grams of stannous chloride in 50 cc. of concentrated hydrochloric acid and 50 cc. of alcohol at 25° C. The mixture so obtained is stirred at 28° C. for 2 hours and at 40–65° C. for 3 hours, at the end of which time a clear solution is obtained. An excess of 50% sodium hydroxide solution is added with stirring and cooling. The mixture is extracted with 100 cc. of chloroform and the aqueous layer is separated, subjected to filtration and extracted with two further portions, each of 50 cc., of chloroform. The combined chloroform extracts are washed with 50 cc. of water, dried over anhydrous sodium sulphate and evaporated. The solid so obtained is recrystallised from a small amount of alcohol. There is thus obtained 4-amino-N-dichloroacet-N-methylanilide in the form of a colourless crystalline solid which has a melting point of 152–153° C. (Found: C, 46.7; H, 4.3. $C_9H_{10}ON_2Cl_2$ requires C, 46.4; H, 4.3%.)

*Example 6*

In the preparation of dichloroacet-4-hydroxy-N-methyl-3:5-dinitroanilide, 20 grams of dichloroacet-4-hydroxy-N-methyl-3-nitroanilide (prepared as described in Example 1) is added slowly to 200 cc. of fuming nitric acid with stirring and cooling to maintain the reaction temperature below 5° C. After addition is complete, the solution so obtained is stirred at 0–5° C. for an hour and is then poured into a large excess of a mixture of ice and water. The precipitate which separates is isolated by filtration and is crystallised from aqueous alcohol to give a yellow crystalline solid which has a melting point of 129–130° C. The crystal structure of this solid changes on keeping at room temperature for a few days to give a stable solid with a higher melting point. There is thus obtained dichloroacet-4-hydroxy-N-methyl-3:5-dinitroanilide in the form of a crystalline solid which has a melting point of 144–146° C. (Found: N, 13.0. $C_9H_7O_6N_3Cl_2$ requires N, 13.0%.)

*Example 7*

In the preparation of dichloroacet-4-ethyl-methylamino-N-methylanilide a solution of 5.7 grams of dichloroacetyl chloride in 5 cc. of benzene is slowly added to a stirred mixture of 5.7 grams of N-ethyl-N:N¹-dimethyl-p-phenylenediamine, 6 grams of sodium acetate, 40 cc. of water and 40 cc. of benzene at about 20° C. When addition is complete an excess of 5 N sodium hydroxide is added and the benzene layer is separated, dried over anhydrous sodium sulphate and evaporated to dryness to give a light-brown syrup. This syrup is dissolved in 12 cc. of absolute alcohol and 6 cc. of 5 N hydrochloric acid is added. The hydrochloride crystallises from this solution after the addition of seed crystals obtained from a test-tube scale preparation and is recrystallised from absolute alcohol. There is thus obtained dichloroacet-4-ethylmethylamino-N-methylanilide hydrochloride in the form of a crystalline solid which has a melting point of 183–184° C. (Found: C, 46.5; H, 5.6; N, 9.1. $C_{12}H_{17}ON_2Cl_3$ requires C, 46.2; H, 5.5; N, 9.0%.) The hydrochloride so obtained is dissolved in 20 cc. of water and a few drops of a dilute aqueous sodium hydrogen sulphite solution are added followed by an excess of dilute ammonium hydroxide solution. The base is thus precipitated, separated by filtration and dried in vacuo. There is thus obtained dichloroacet-4-ethylmethylamino-N-methylanilide in the form of a crystalline solid which has a melting point of 47–48° C. (Found: N, 10.5. $C_{12}H_{16}ON_2Cl_2$ requires N, 10.7%.)

N-ethyl-N:N¹-dimethyl-p-phenylenediamine which is employed in the above preparation is prepared in the following manner. A mixture of 11 grams of N-ethyl-4-formamido-N-methylaniline, 17 grams of potassium hydroxide and 100 cc. of acetone is heated under reflux with stirring for 15 minutes and at the end of this time, 7 cc. of methyl iodide in 10 cc. of acetone is slowly added to the boiling reaction mixture. After heating under reflux for a further 10 minutes, the mixture is allowed to cool, the potassium iodide which is precipitated is removed by filtration and the solvent is removed from the filtrate by distillation. The residual gum is hydrolysed by heating under reflux with 40 cc. of 2 N hydrochloric acid for 1.5 hours, and the resulting solution is evaporated to dryness under reduced pressure. The residue is dried by evaporating twice with 50 cc. of absolute alcohol. The crude hydrochloride so obtained is converted to the free base by treatment with sodium hydroxide solution and the oil so obtained is removed by extraction with three 100 cc. portions of benzene. The resulting benzene extracts are combined and the benzene removed by distillation. The residual oil is distilled under reduced pressure and that fraction which has a boiling point of 118° C. under a pressure of 2 mm. of mercury is collected. There is thus obtained N-ethyl-N:N¹-dimethyl-p-phenylenediamine in the form of a colourless oil which has a boiling point of 118° C. under a pressure of 2 mm. of mercury. (Found: C, 72.9; H, 9.7. $C_{10}H_{16}N_2$ requires C, 73.1; H, 9.8%.)

N-ethyl-4-formamido-N-methylaniline which is employed in the above preparation is prepared as follows. To a solution of 30 grams of N-methyl-N-ethylaniline in a mixture of 105 cc. of concentrated hydrochloric acid and 50 cc. of water, there is added 18 grams of sodium nitrite in 30 cc. of water with stirring. This solution is added below the surface of the amine solution and the reaction mixture is kept at a temperature below 8° C. by external cooling. When addition is complete the reaction mixture is stirred for a further 45 minutes at 0° C., and then the precipitate formed during the reaction is removed by filtration, washed with 40 cc. of a mixture of equal volumes of concentrated hydrochloric acid and water, followed by 10 cc. of alcohol and dried in vacuo. The crude N-ethyl-N-methyl-4-nitrosoanilinium chloride so obtained is added portionwise to a stirred solution of 140 grams of stannous chloride in 300 cc. of concentrated hydrochloric acid at 95° C. and the reaction mixture is maintained at this temperature for 30 minutes before being cooled in ice and saturated with hydrogen chloride. The precipitate of stannicchloride so obtained is isolated by filtration, dissolved in 80 cc. of water and the solution is basified by the addition of 40% sodium hydroxide in the presence of 100 cc. of ether. After filtering, the ether layer is separated and the aqueous layer is further extracted with two portions of 100 cc. of ether. The ether extracts are combined, dried over anhydrous sodium sulphate and the solvent removed by evaporation. The crude 4-amino-N-ethyl-N-methylaniline so obtained is heated under reflux with 25 cc. of formic acid for 45 minutes and the resulting solution poured on to ice and basified. The oil which separates crystallises on standing and is recrystallised from carbon tetrachloride. There is thus obtained N-ethyl-4-formamido-N-methylaniline in the form of a crystalline solid which has a melting point of 77–79° C. (Found: N, 15.9. $C_{10}H_{14}ON_2$ requires N, 15.7%.)

*Example 8*

In the preparation of dichloroacet-4-diethylamino-N-methylanilide a solution of 6 grams of dichloroacetyl chloride in 10 cc. of benzene is slowly added to a stirred mixture of 8.75 grams of N:N-diethyl-N¹-methyl-p-phenylenediamine dihydrochloride, 15.6 grams of sodium acetate, 50 cc. of water and 50 cc. of benzene at about 20° C. When addition is complete an excess of 5 N sodium hydroxide is added and the benzene layer is separated, dried over anhydrous sodium sulphate and evaporated to dryness. The residual oil crstallises on standing and is recrystallised twice from petroleum ether (boiling range 60–80° C.). There is thus obtained dichloroacet-4-diethylamino-N-methylanilide in the form of a crystalline solid which has a melting point of 63–65° C. (Found: C, 54.6; H, 6.4. $C_{13}H_{18}ON_2Cl_2$ requires C, 54.0; H, 6.3%.)

N:N - diethyl-N¹-methyl-p-phenylenediamine dihydrochloride which is employed in the above preparation is prepared in a similar manner to that described in Example 7 for N-ethyl-N:N¹-dimethyl-p-phenylenediamine, using N:N-diethyl-4-formamidoaniline in place of N-ethyl-4-formamido-N-methylaniline. In this case the dihydrochloride is a readily crystallisable solid and is recrystallised from alcohol. There is thus obtained N:N-diethyl-N¹ - methyl-p-phenylenediamine dihydrochloride in the form of a crystalline solid which has a melting point of 209° C. with decomposition. (Found: N, 10.6.

$$C_{11}H_{20}N_2Cl_2$$

requires N, 11.2%.)

N:N-diethyl-4-formamidoaniline which is employed in the above preparation is prepared in a similar manner to that described in Example 7 for N-ethyl-4-formamido-N-methylaniline, using N:N-diethylaniline in place of N-methyl-N-ethylaniline. In this case the product is obtained as an oil which is distilled and that fraction which has a boiling point of 180° C. under a pressure of 2 mm. of mercury is collected. There is thus obtained N:N-diethyl-4-formamidoaniline in the form of an oil which has a boiling point of 180° C. under a pressure of 2 mm. of mercury. (Found: N, 14.8. $C_{11}H_{16}ON_2$ requires N, 14.6%.)

We claim:

1. A dichloroacetanilide of the formula

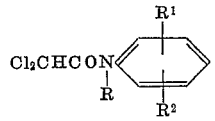

in which R is a lower alkyl radical, $R_1$ is a member selected from the group consisting of nitro, amino, and di-lower alkyl substituted amino groups and $R_2$ is a member selected from the group consisting of hydrogen and hydroxy groups.

2. Dichloroacet-4-hydroxy-N-methyl-3-nitroanilide.
3. Dichloroacet-N-methyl-4-nitroanilide.
4. Dichloroacet-4-dimethylamino-N-methylanilide.
5. 3-amino-N-dichloroacet-4-hydroxy-N-methylanilide.
6. 4-amino-N-dichloroacet-N-methylanilide.

References Cited in the file of this patent

FOREIGN PATENTS 521,876     Belgium _____ Aug. 31, 1953

OTHER REFERENCES

McKie: J. Chem. Soc. (London), vol. 123 (1923), pp. 2214–17.

Clark et al.: Biochem. J., vol. 55 (1953), pp. 839–51.